United States Patent Office 3,413,374
Patented Nov. 26, 1968

3,413,374
DISPROPORTIONATION OF TOLUENE
Masaki Sato, Takeshi Sonoda, Yukio Kinoshita, Toshio Mizushima, and Michio Kashiwagi, Kamakura-shi, Japan, assignors to Toyo Rayon Kabushiki Kaisha, Tokyo, Japan, a corporation of Japan
No Drawing. Filed Apr. 28, 1967, Ser. No. 634,445
Claims priority, application Japan, May 4, 1966, 41/27,927; Oct. 28, 1966, 41/70,757; Dec. 30, 1966, 41/85,830
12 Claims. (Cl. 260—672)

ABSTRACT OF THE DISCLOSURE

A method of disproportionating toluene by contacting toluene in the vapor phase with a catalyst containing aluminum fluoride and alumina.

---

This invention relates to a new method of carrying out the disproportionation of toluene and, in particular, to a disproportionation method wherein the disproportionation of toluene is accomplished by contacting it with a new catalyst to yield benzene and xylenes.

As catalysts to be used in the disproportionation reaction, the so-called solid acid catalysts, such as silica-alumina, silica-alumina-silver, alumina-boria, etc., have been known to date. All of these catalysts, however, had one or more of such defects as low activity and short life. Further, a catalyst consisting of silica-alumina to which have been added halides which are unstable at high temperatures, fluorides such as boron fluoride, is also known. Although the initial activity of this catalyst is high, its activity is not lasting, its life being merely a short period of several hours, and hence it is not practical for commercial use.

Accordingly, the development of a catalyst which was utilized commercially effectively in the method of disproportionating toluene, i.e., a catalyst having long life which was able to carry out the disproportionation of toluene at high conversion and in good yield, was desired.

Thus, this invention is directed to a method of disproportionating toluene which is characterized by that toluene is contacted with a catalyst containing aluminum fluoride and alumina, in the vapor phase at a temperature between 400° and 600° C.

It is therefore an object of this invention to provide a new method of disproportionating toluene. Another object is to provide a toluene disproportionation catalyst which can be effectively utilized commercially.

The toluene disproportionation catalyst according to this invention is a catalyst which contains aluminum fluoride and alumina.

Aluminum fluoride, which is one of the components of the invention catalyst, must not have a history of having been calcined substantially above 700° C. in its solid state prior to use in the method of this invention and involves mainly II- and III-form, which will be described in detail later. If aluminum fluoride is kept in its solid state for, say, one hour at a temperature substantially above 700° C., it becomes transformed into I-aluminum fluoride, a high-temperature stable form (hereinafter referred to as I-form). When this I-form is used as one of the components of the catalyst in the disproportionation reaction of toluene, the activity of the catalyst decreases considerably. It is to be understood that by aluminum fluoride which does not have a history of having been calcined substantially above 700° C. is meant the one which has not completely been transformed into the aforesaid I-form. In other words, aluminum fluoride which has been transformed to some extent into the I-form can be suitably used as one of the components of the invention catalyst.

Aluminum fluorides which can be used in this invention include, e.g., aluminum fluoride hydrates (alpha-$AlF_3 \cdot 3H_2O$ or beta-$AlF_3 \cdot 3H_2O$) prepared by the methods described by E. Baud, Ann. Chem. Phys. (8), 1, 60 (1904), A. Mazuchelli, Atti. Accad. Lincei. (5), 16i, 775 (1907) and W. F. Finret, F. T. Frere, J. Am. Chem. Soc., 67, 64 (1945); aluminum fluorides obtained by reacting alumina, aluminum hydroxide or the mixture thereof with an excess of anhydrous hydrogen fluoride at 200°–500° C.; and aluminum fluorides obtained by reacting aluminum chloride with an excess of anhydrous hydrogen fluoride at 20°–400° C. While all of the foregoing aluminum fluorides or hydrates thereof are suitable for use as one of the components of the catalyst according to this invention, preferred are the II- and III-aluminum fluoride prepared by dehydrating, respectively, the alpha- and beta-aluminum trifluoride trihydrate at a temperature between 150° and 700° C., preferably between 200° and 500° C., until water ceases to be evolved therefrom; or a mixture of the II- and III-forms. As is apparent from the hereinafter given examples, II-aluminum fluoride exhibits the greatest catalytic activity in the toluene disproportionation reaction and hence is especially to be preferred.

These II- and III-forms are readily distinguished from the I- form, not suitable for this invention, by X-ray analysis of their crystals. An X-ray diffraction pattern of the I-form is given on ASTM card 9–138. Further, X-ray diffraction lines of the II- and III-forms are given in the following Tables A and B, respectively, and II-form is different from either I-form or III-form.

Crystallites of the I-form are usually large as compared with those of other modifications. According to our measurements, the size was about 1,000 A. or more. Of course, it is possible to prepare the I-form of smaller crystallites, depending upon methods of its preparation.

The crystallites of the II- and III-forms are generally smaller than those of the I-form.

Table A

| d(A.): | Intensity [1] | d(A.): | Intensity [1] |
|---|---|---|---|
| 6.015 | vvs | 1.585 | vw |
| 3.562 | vvs | 1.558 | vw |
| 3.467 | s | 1.535 | w |
| 3.008 | vs | 1.503 | w |
| 2.488 | vw | 1.382 | vw |
| 2.298 | vw | 1.330 | vw |
| 2.270 | vw | 1.313 | vw |
| 2.212 | vw | 1.284 | vw |
| 2.166 | vw | 1.244 | w |
| 2.002 | w | 1.217 | vw |
| 1.918 | m | 1.202 | vw |
| 1.781 | m | 1.189 | vw |
| 1.734 | m | 1.149 | vw |
| 1.710 | w | 1.136 | vw |
| 1.667 | w | | |

[1] v=very, s=strong, w=weak, m=medium.

TABLE B

| d (A.): | Intensity [2] | d (A.): | Intensity [2] |
|---|---|---|---|
| 3.534 | vvs | 1.588 | m |
| 2.130 | vw | 1.451 | vw |
| 2.040 | vw | 1.255 | vw |
| 1.771 | s | | |

[2] The symbols have the same meaning as defined in Table A, above.

Alumina, another essential component of the catalyst of this invention may be of any form. This includes, for example, alumina sol, amorphous alumina, chi-alumina, rho-alumina, gamma-alumina, eta-alumina and the like. Particularly preferred is one which has been obtained by the thermal treatment at 300°–600° C. of amorphous alumina obtained by the rapid drying of an alumina sol, it being preferred that the thermal treatment is not carried out substantially above 700° C.

The invention catalyst contains as its essential components the hereinbefore described aluminum fluoride and alumina and, if desired, it may also contain such other components as silica, thoria and titania. The incorporated silica component is especially effective in prolonging the life of the catalyst. By thermally treating a mixture of these catalyst components in the solid state at 400°–600° C., and preferably at 450°–600° C., a toluene disproportionation catalyst having high activity as well as long life can be obtained. The mixture of the catalyst components may be obtained, say, by mixing aluminum fluoride with an alumina sol to form a gel which is then dried, or by mixing finely divided granules of the two components. When finely divided granules are to be used, those with particle size of below 30 mesh are especially favorable. Further, even when the foregoing catalyst components are mixed and as such used as catalyst in this invention without prior thermal treatment, the objects of the invention are attained. In this case, it is believed that since, as hereinafter described, the toluene disproportionation reaction is carried out at a temperature between 400° and 600° C., the catalyst components are activated by being heated during the course of the reaction.

As is further illustrated in the hereinafter given examples, aluminum fluoride and alumina individually possess little, if any, catalytic activity in promoting the disproportionation reaction of toluene, but when the two are combined and thermally treated, the pronounced catalytic activity is exhibited. Namely, when these two components are thermally treated in the solid state, it is believed that a solid phase reaction takes place between the two components to form a new Al-F bond, with the consequence that a pronounced catalytic activity is imparted to the two components.

A thermal treatment period ranging from 2 to 24 hours is usually chosen.

A proportion in which the two components are used in making up the catalyst composition is as follows: 5–40% by weight, preferably 10–25% by weight, of aluminum fluoride and 95–60% by weight, preferably 90–75% by weight, of alumina.

Aside from the two essential components, other components such as silica, thoria and titania may also be added.

A particle size of the catalyst is suitably determined in accordance with customary procedures depending upon the reaction modes in which the catalyst is to be used, such as the fluidized, moving or fixed bed. The catalyst can also be molded. Once the invention catalyst has been prepared by calcination, a deactivation phenomenon of the catalyst does not occur considerably even when it is heated above 700° C. This, along with the fact that it can disproportionate toluene at high conversion and in good yield and with its long life, is a surprising fact.

When a decline in the activity of the invention catalyst takes place as the toluene disproportionation reaction proceeds, owing to deposition of carbonaceous matter on the catalyst, regeneration of the catalyst can be accomplished through removal of the carbonaceous matter by a process such as burning as in the case of a silica-alumina catalyst.

The mode of operation of the vapor phase disproportionation reaction of toluene using the hereinbefore described new catalyst according to this invention is as follows:

The reaction temperature ranges from 400° to 600° C., and preferably between 450° and 550° C. The contact time is 5–50 seconds. In general, the process of the convention is conducted at a space velocity in the range from about 0.1 to about 20. Space velocity, as the term is used herein, refers to WHSV and is expressed as weights of feed per hour, per unit weight of catalyst. On the other hand, the reaction pressure employed is from normal atmospheric pressure to 200 atmospheres. The reaction is conveniently carried out using as carrier gas nitrogen, hydrogen, or lower hydrocarbons, or a mixture thereof, by which toluene is diluted. When hydrogen is used as the carrier gas, the reaction is carried out to greater advantage under superatmospheric pressure.

When the toluene disproportionation reaction is carried out under the foregoing conditions using the new catalyst of this invention, the rate of conversion of toluene under hydrogen pressure at 530° C. is 50% and the life of said catalyst is so long that it does not lose much of its activity even after 100 hours of use. On the other hand, when this reaction is carried out using the conventional catalysts such as those consisting of silica-alumina or alumina-boria, or silica-alumina to which has been added a fluoride unstable at high temperatures, the rate of conversion of toluene under the same conditions is 30–50%, and the life of the catalyst is only several hours at most. Hence, it is obvious that the invention method is commercially of much greater advantage than the conventional methods.

The following nonlimiting examples are given for further illustration of this invention. Small alphabet letters appearing in the examples are mere symbols for distinguishing aluminum fluorides treated under various heating conditions.

EXAMPLE 1

A spectrum according to the powder method of X-ray diffraction of aluminum fluoride (b) obtained by thermal treating of beta-aluminum fluoride trihydrate (a) (beta-$AlF_3 \cdot 3H_2O$) for 10 hours at 400° C. resembles that of aluminum fluoride of ASTM card 9–183, but is not in perfect agreement that is, III-form. Eighteen grams of aluminum fluoride (b) was added to 1,000 grams of an aqueous alumina sol containing 100 grams of $Al_2O_3$, with stirring, and the mixture was stirred for an additional hour. This was followed by drying the mixture for 16 hours at 150° C. and thereafter calcining for 12 hours at 500° C. In the presence of 12.0 grams of the so prepared 60–100 mesh $AlF_3$-$Al_2O_3$ catalyst A and employing a fixed bed type normal pressure reactor, the disproportionation reaction of toluene was carried out at an average reaction temperature of 510° C. and a rate of flow of the toluene of 11 grams per hour. As a result, the toluene conversion rate (an average of 10 hours after the start of the reaction) was 25.5%, the yield of benzene plus xylenes was 97%, and the molar ratio of xylenes to benzene was 0.87. The composition of the resulting xylenes was nearly equal to that of a thermodynamic equilibrium mixture, i.e., 22% o-xylene, 54% m-xylene and 24% p-xylene. This indicates that isomerization of xylenes proceeds under milder conditions by using the hereinbefore described catalyst. When this catalyst was used for 20 hours and the toluene conversion rate declined to 17.3%, it was regenerated by burning in air the carbonaceous matter which had deposited on the catalyst. The restoration of the catalyst to its initial activity was observed.

EXAMPLE 2

An alumina sol was rapidly dried at 160–180° C., after which the dried product was calcined for 6 hours at 500° C. to yield a 30–60 mesh alumina (hereinafter referred to as alumina–500). Six kinds of aluminum fluoride, namely aluminum fluoride (b) and aluminum fluorides (b) calcined for one hour respectively at 580°, 630°, 670°, 700° and 1200° C. (hereinafter referred to respectively as c-, d-, e-, f- and g-aluminum fluoride were mixed with the hereinbefore described alumina–500 such that they would be contained each in an amount of 20% by weight. These mixtures were then calcined for 6 hours at 500° C.

Using the so prepared six kinds of $AlF_3$-$AlF_2O_3$ catalysts (B, C, D, E, F and G), the disproportionation reaction was carried out under the same conditions as in Example 1, with results shown in Table I. The reaction was carried out for 2 hours in each case, and the average values of the results are shown.

Further, catalysts H and J obtained by calcining catalyst B for 6 hours at 600° and 700° C. respectively were used and the reaction was carried out under the same conditions as in Example 1, with results shown in Table II. The spectrum of aluminum fluoride (g) obtained by means of the powder X-ray diffraction method was in nearly perfect agreement with that of the ASTM card 9–138. The size of crystallites of aluminum fluoride (g), as calculated from the half value width of its spectrum, was very large as compared to that of aluminum fluoride (b).

TABLE I

| Catalyst: | Calcination temperature of AlF$_3$, °C. | Toluene conversion, percent | Yield, percent | Disproportionation rate [1] |
|---|---|---|---|---|
| B | (400) | 26.2 | 95 | 0.85 |
| C | 580 | 25.4 | 95 | 0.88 |
| D | 630 | 22.8 | 96 | 0.88 |
| E | 670 | 17.2 | 97 | 0.92 |
| F | 700 | 7.3 | 98 | 0.95 |
| G | 1,200 | 0.6 | 99 | |

[1] See footnote at bottom of Table II.

TABLE II

| Catalyst: | Calcination temperature of catalyst, °C. | Toluene conversion, percent | Yield, percent | Disproportionation rate [1] |
|---|---|---|---|---|
| B | 500 | 26.2 | 95 | 0.85 |
| H | 600 | 24.8 | 96 | 0.84 |
| J | 700 | 20.7 | 98 | 0.88 |

[1] Disproportionation rate, as here used, denotes a xylene/benzene molar ratio and indicates the extent to which the disproportionation reaction as intended by this invention has taken place. This definition will also apply in the hereinafter given examples.

The activity of catalysts F and G, which have been obtained by calcining aluminum fluoride at temperatures above 700° C., manifests a marked decline as compared with those calcined below 700° C. This indicates that transformation into I-form of aluminum fluoride proceeds rapidly at temperatures above 700° C., and hence that such an aluminum fluoride is not desirable as the starting material for preparing the catalyst.

On the other hand, as is apparent from Table II, the effect of the calcination temperature on a catalyst which has been once prepared is considerably less than that in the case of aluminum fluoride, and this indicates that considerable thermal stability is possessed by an active site of the catalyst. From this fact, it can be understood that the modification of aluminum fluoride before it is converted to a catalyst affects its catalytic activity. A catalyst which is prepared from aluminum fluoride and alumina has an active site due to combination of the two components, which exhibits a catalytic activity irrespective of the calcination temperature. Thus, in contrast to the case of aluminum fluoride alone, the catalytic activity is substantially unaffected by the calcination temperature, once the catalyst is prepared.

EXAMPLE 3

Alpha-aluminum fluoride trihydrate (h)

(alpha-AlF$_3$·3H$_2$)

or beta-aluminum fluoride trihydrate (a)

(beta-AlF$_3$·3H$_2$O)

was mixed with alumina–500 so that the contents of the former, calculated as AlF$_3$, would become 20% by weight, and the mixture was calcined for 6 hours at 500° C. Using the so prepared AlF$_3$-Al$_2$O$_3$ catalysts K and L, the disproportionation reaction was carried out as in Example 1, with results shown in Table III (the reaction time was 6 hours).

TABLE III

| Catalyst: | Starting material AlF$_3$ | Toluene conversion, percent | Yield, percent | Disproportionation rate |
|---|---|---|---|---|
| K | h | 26.6 | 96 | 0.88 |
| L | a | 25.4 | 96 | 0.86 |

It can be seen from Table III that good catalysts can also be obtained by calcination of a mixture of aluminum fluoride hydrate and alumina.

EXAMPLE 4

Alpha-aluminum fluoride trihydrate (h)

(alpha-AlF$_3$·3H$_2$)

was calcined for 10 hours at 400° C. to yield aluminum fluoride (i) (II-form) [the spectrum (Cuka) by means of the powder X-ray diffraction method is given in Table A.] The foregoing aluminum fluoride (i) or aluminum fluoride (j) obtained by calcining aluminum fluoride (i) for one hour at 700° C. was mixed with alumina-500 such that the contents of the former would become 20% by weight, and the mixture was calcined for 6 hours at 500° C. The so prepared two kinds of catalysts M and N were used, and the disproportionation reaction was carried out as in Example 1, with results shown in Table IV. As in Example 2, it was confirmed that aluminum fluoride to be used in the invention process must be one not having a history of having been treated at temperatures above 700° C.

TABLE IV

| Catalyst: | Starting material AlF$_3$ | Toluene conversion, percent | Yield, percent | Disproportionation rate |
|---|---|---|---|---|
| M | i | 34.8 | 95 | 0.78 |
| N | j | 7.2 | 98 | 0.98 |

EXAMPLE 5

5–1. Alumina-500 was placed in a stainless steel reaction tube, and a excess of anhydrous hydrogen fluoride was introduced therein at 400° C. After reacting the two components for 6 hours, the hydrogen fluoride in the tube was purged with nitrogen, thereby obtaining aluminum fluoride (k).

5–2. Powdered aluminum hydroxide was treated by the same procedure as described in 5–1 to obtain aluminum fluoride (l).

5–3. Anhydrous aluminum chloride was placed in a stainless steel reaction tube, and hydrogen fluoride was introduced in the initial stage of the reaction at 20° C. The reaction temperature was gradually raised at a rate such as would not cause sublimation of the aluminum chloride until it reached 400° C. 4 hours after the start of the reaction. By treating as in 5–1, aluminum fluoride was obtained (m).

The three kinds of aluminum fluoride thus obtained were mixed each with alumina-500 in such a proportion that the contents of the former would become 20% by weight, and the mixture was calcined for 6 hours at 500° C. The so prepared AlF$_3$-Al$_2$O$_3$ catalysts O, P and Q were used and the disproportionation reaction was carried out as in Example 1, with results shown in Table V.

| Catalyst: | Starting material AlF$_3$ | Toluene conversion, percent | Yield, percent | Disproportionation rate |
|---|---|---|---|---|
| O | k | 33.5 | 94 | 0.75 |
| P | l | 28.3 | 95 | 0.83 |
| Q | m | 31.6 | 95 | 0.78 |

EXAMPLE 6

Alumina fluoride (b) was mixed with alumina-500 in such proportions that the contents of the former would become 0, 5, 10, 20, 30, 40, 50 and 100% by weight.

These mixtures were then calcined for 6 hours at 500° C. Using the so prepared $AlF_3$-$Al_2O_3$ catalysts R, S, T, U, V, W, X and Y, the toluene disproportionation reaction was carried out as in Example 1, with results shown in Table VI.

It is apparent from Table VI that catalysts whose aluminum fluoride content is in the range of 5–40% by weight, and particularly 10–25% by weight, possess a high disproportionation activity. Further, it is seen that aluminum fluoride and alumina per se possess little, if any, disproportionation activity and that high disproportionation activity is demonstrated only upon incorporating them into a catalyst by mixing them in the hereinabove indicated proportions followed by calcining.

TABLE VI

| | $AlF_3$ content, percent | Toluene conversion, percent | Yield, percent | Disproportionation rate |
|---|---|---|---|---|
| Catalyst: | | | | |
| R | 0 | 0.2 | 99 | |
| S | 5 | 16.6 | 97 | 0.95 |
| T | 10 | 22.4 | 95 | 0.90 |
| U | 20 | 26.2 | 95 | 0.85 |
| V | 30 | 21.8 | 96 | 0.93 |
| W | 40 | 18.5 | 97 | 0.90 |
| X | 50 | 13.5 | 97 | 0.93 |
| Y | 100 | 0.1 | 99 | |

EXAMPLE 7

The disproportionation reaction was carried out using $AlF_3$-$Al_2O_3$ catalyst B and a fixed bed type pressure reactor under the following reaction conditions: average reaction temperature 500° C., $W/F$=50 g.-cat hr./g.-mol, carrier gas hydrogen $F_H/F_T$=1.0, and reaction pressures 1, 10, 20 and 40 atm. Results obtained are shown in Table VII. From these results, it is noted that an increase or in the reaction velocity takes place in a pressurized system. Further, it can be seen that it is preferable to carry out the toluene disproportionation reaction at from 1 to 200 atom.

TABLE VII

| Reaction pressure, atm. | Toluene conversion, percent | Yield, percent | Disproportionation rate |
|---|---|---|---|
| 1 | 8 | 97 | 0.95 |
| 10 | 38 | 96 | 0.75 |
| 20 | 47 | 96 | 0.72 |
| 40 | 55 | 96 | 0.72 |

EXAMPLE 8

The disproportionation reaction was carried out using $AlF_3$-$Al_2O_3$ catalyst B and a fixed bed type normal pressure reactor under the following reaction conditions: average reaction temperature 510° C., $W/E$=100 g.-cat hr./mol, carrier gas none, and reaction time 20 hours. Results obtained are shown in Table VIII.

TABLE VIII

| | Carrier gas | Conversion | Yield | Disproportionation rate | Carbon deposition rate C/T (percent) |
|---|---|---|---|---|---|
| Catalyst: | | | | | |
| B | None | 26.2 | 95 | 0.85 | 1.2 |
| B | $H_2$ | 21.2 | 94 | 0.91 | 0.4 |

A ratio (percent) of the amount of carbonaceous matter deposited on the catalyst, which is the main cause of lowering of the catalytic activity, to that of toluene passed. A decreased value of this ratio means an increase in the catalyst life.

EXAMPLE 9

The disproportionation reaction was carried out using $AlF_3$-$Al_2O_3$ catalyst B and a fixed bed type pressure reactor under the following condition: average reaction temperature 500° C., $WF$=200 g.-cat hr./g.-mol, carrier gas molar ratio of nitrogen or hydrogen to feed of 20:1, reaction time 20 hours, and reaction pressure 30 atm. The results obtained are shown in Table IX.

TABLE IX

| | Carrier gas | Conversion | Yield | Disproportionation rate | Carbon deposition rate |
|---|---|---|---|---|---|
| Catalyst: | | | | | |
| B | $N_2$ | 47.6 | 96 | 0.80 | 0.75 |
| B | $H_2$ | 43.8 | 99 | 0.87 | 0.33 |

EXAMPLE 10

An aqueous suspension of 20 grams of aluminum fluoride was added to a mixture of 360 grams of alumina sol containing 40 grams of $Al_2O_3$, and 300 grams of silica sol containing 60 grams of $SiO_2$. The so obtained mixture was gelled at room temperature, dried for 24 hours at 120° C. and thereafter calcined for 5 hours at 450° C. The disproportionation reaction was carried out in the presence of 20 grams of the prepared $AlF_3$-$Al_2O_3$-$SiO_2$ catalyst, at an average reaction temperature of 600° C. and a rate of flow of toluene of 20 grams per hour, with nitrogen of 4 liters per hour plus hydrogen of 2 liters per hour as carrier gas. The toluene conversion was 19% and the yield of benzene plus xylenes was 95%.

EXAMPLE 11

A catalyst was prepared as in Example 1 from 630 grams of alumina sol containing 70 grams of $Al_2O_3$, 150 grams of silica sol containing 30 grams of $SiO_2$, and 20 grams of aluminum fluoride. In the presence of 20 grams of the so prepared catalyst, the disproportionation reaction was carried at an average reaction temperature of 600° C. and a rate of flow of toluene of 20 grams per hour, with nitrogen of 6 liters per hour as carrier gas. The toluene conversion was 26% and the yield of benzene plus xylenes was 92%.

EXAMPLE 12

For the purpose of comparison with the aluminum fluoride-alumina catalyst of this invention, experiments were conducted using alumina-boria and silica-alumina-silver by the same method as described in Example 2, and results as shown in the following Table X were obtained.

TABLE X

| Catalyst | Catalyst life time | Conversion of toluene (6 hrs. average), percent | Yield, percent |
|---|---|---|---|
| $AlF_3$-$Al_2O_3$(A) | No change after 6 hours | 25.9 | 96 |
| Alumina-boria | Activity lowered to ½ after 1 hour. | 10.8 | 97 |
| Silica-alumina-silver. | Activity lowered to ¼ after 3 hours, ⅙ after 6 hours. | 11.0 | 94 |

What we claim:

1. A method of disproportionating toluene which comprises contacting toluene in the vapor phase at a temperature between 400° and 600° C., with a catalyst containing aluminum fluoride and alumina.

2. The method according to claim 1, wherein said catalyst is obtained by calcining at a temperature between 400° and 600° C. a mixture consisting of finely divided aluminum fluoride and finely divided alumina.

3. The method according to claim 1, wherein said catalyst contains aluminum fluoride, alumina and silica.

4. The method according to claim 1, wherein said catalyst contains 5–40% by weight of aluminum fluoride and 95–60% by weight of alumina.

5. The method according to claim 1, wherein said catalyst contains preferably 10–25% by weight of aluminum fluoride and 90–75% by weight of alumina.

6. The method according to claim 1, wherein said aluminum fluoride does not have a history of having been heated at a temperature substantially above 700° C.

7. The method according to claim 1, wherein said aluminum fluoride is II-aluminum fluoride obtained by calcining alpha-aluminum fluoride trihydrate at a temperature below 700° C.

8. The method according to claim, 1, wherein said aluminum fluoride is III-aluminum fluoride obtained by calcining beta-aluminum fluoride trihydrate at a temperature below 700° C.

9. The method according to claim 1, wherein said alumina is that which has been obtained by calcining at 300–600° C. amorphous alumina obtained by rapidly drying an alumina sol.

10. The method according to claim 1, wherein toluene is contacted with the catalyst at a temperature between 450° and 550° C.

11. The method according to claim 1, wherein toluene is used by diluting with a carrier gas.

12. The method according to claim 1, wherein toluene is used by diluting with hydrogen gas.

References Cited

UNITED STATES PATENTS

| 2,615,056 | 10/1952 | Nickels | 260—668 |
|---|---|---|---|
| 3,068,302 | 12/1962 | Schriesheim | 260—672 |

FOREIGN PATENTS 458,126  7/1949  Canada.

DELBERT E. GANTZ, *Primary Examiner.*

C. R. DAVIS, *Assistant Examiner.*